(12) United States Patent
Patel et al.

(10) Patent No.: US 12,739,188 B2
(45) Date of Patent: Sep. 15, 2026

(54) COST-AWARE PROVISIONING AND ROUTING IN A MULTI-CLOUD ENVIRONMENT

(71) Applicant: Arrcus Inc., San Jose, CA (US)

(72) Inventors: Keyur Patel, San Jose, CA (US); Lakshman Swaroop Babu, Danville, CA (US); Sujay Gopinathan, Fremont, CA (US); Kalyani Rajaram, San Jose, CA (US); Ashish Swaroop, Fremont, CA (US)

(73) Assignee: Arrcus Inc., San Jose, CA (US)

( * ) Notice: Subject to any disclaimer, the term of this patent is extended or adjusted under 35 U.S.C. 154(b) by 0 days.

(21) Appl. No.: 18/652,296

(22) Filed: May 1, 2024

(65) Prior Publication Data

US 2025/0119374 A1 Apr. 10, 2025

Related U.S. Application Data

(63) Continuation-in-part of application No. 18/483,925, filed on Oct. 10, 2023.

(51) Int. Cl.

*H04L 45/12* (2022.01)
*H04L 45/586* (2022.01)
*H04L 67/10* (2022.01)

(52) U.S. Cl.

CPC ............ *H04L 45/12* (2013.01); *H04L 45/586* (2013.01); *H04L 67/10* (2013.01)

(58) Field of Classification Search

None

See application file for complete search history.

(56) References Cited

U.S. PATENT DOCUMENTS

| | | | | |
|---|---|---|---|---|
| 11,929,838 | B1 | 3/2024 | Singhal | |
| 2015/0304206 | A1* | 10/2015 | Filsfils | H04L 45/46 709/238 |
| 2016/0248658 | A1* | 8/2016 | Patel | H04L 45/488 |
| 2019/0158605 | A1* | 5/2019 | Markuze | H04L 12/4641 |
| 2020/0106696 | A1 | 4/2020 | Michael | |
| 2020/0136844 | A1 | 4/2020 | Hill | |
| 2021/0288902 | A1* | 9/2021 | Arora | G06Q 50/26 |
| 2021/0377156 | A1 | 12/2021 | Michael | |
| 2022/0393965 | A1 | 12/2022 | Shen | |
| 2025/0119375 | A1* | 4/2025 | Patel | H04L 12/1421 |

* cited by examiner

*Primary Examiner* — June Sison

(74) *Attorney, Agent, or Firm* — David R. Stevens; Stevens Law Group

(57) ABSTRACT

Cost aware routing in a network topology to reduce costs within an egress-based pricing model. A method includes receiving telemetry data from one or more of a network device or a compute device within a cloud computing network, wherein the telemetry data is associated with a customer of the cloud computing network. The method includes retrieving an egress-based pricing scheme associated with a provider of the cloud computing network and provisioning one or more of the network device or the compute device to optimize routing decisions for the customer to reduce a predicted data egress charge for the customer. A route may be selected to traverse multiple clouds and/or colocation providers according to ingress, egress, and transfer charges. Segment routing and VRFs may be used to implement routes selected based on criteria such as cost, latency, throughput, and jitter.

14 Claims, 12 Drawing Sheets

Routing Prioritization 500

Query Cloud API To Determine Egress-Based Pricing Scheme For One Or More Providers Of One Or More Interconnected Cloud Computing Networks. 602

Determine Region, Cloud Computing Network Provider, And Subnets Connected To One More Interfaces. 604

Identify A Plurality Of Paths For Routing A Data Package From A Source Address To A Destination Address. 606

Calculate A Total Egress Cost For Each Of The Plurality Of Paths. 608

Select A Least Expensive Path Comprising A Lowest Total Egress Cost, Irrespective Of Whether The Least Expensive Path Comprises A Fewest Quantity Of Hops Or Shortest Distance. 610

FIG. 6

Receive Telemetry Data From One Or More Of A Network Device Or A Compute Device Within A Cloud Computing Network, Wherein The Telemetry Data Is Associated With A Customer Of The Cloud Computing Network. 702

Retrieve An Egress-Based Pricing Scheme Associated With A Provider Of The Cloud Computing Network. 704

Provision One Or More Of The Network Device Or The Compute Device To Optimize Routing Decisions For The Customer To Reduce A Predicted Data Egress Charge For The Customer. 706

FIG. 7

COST-AWARE PROVISIONING AND ROUTING IN A MULTI-CLOUD ENVIRONMENT

RELATED APPLICATIONS

This application is a continuation in part of U.S. patent application Ser. No. 18/483,925, filed on Oct. 10, 2023, the disclosures of which is hereby incorporated by reference herein in its entirety.

TECHNICAL FIELD

The disclosure relates to computing networks and particularly relates to data routing with financial cost optimization.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connected over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding based on routing tables which maintain a record of the routes to various network destinations. Routing tables may be specified by an administrator, learned by observing network traffic, or built with the assistance of routing protocols. The routing path is typically optimized to select for the shortest path (i.e., lowest cost), lowest jitter, lowest latency, or compliance with a predefined Service Level Agreement (SLA). The routing path will be determined based on the traffic type and other requirements.

Typically, customers use public and/or private cloud services for flexibility and cost savings. In some cases, cloud services are offered with zero capex or maintenance costs such that customers only pay for services used. Data traffic for these customers typically moves in and out of cloud networks depending on services across different clouds and geographical regions. Although the cloud can provide significant cost savings for customers, in some cases it remains important to optimize costs for the customer. The cost of data is a significant cost when using the cloud and can quickly add up depending on how the customer elects to transport data.

In some cases, public cloud providers charge customers for egress traffic to various destinations. Different cites may have different egress charges, and these egress charges may further depend on the time of day, the current traffic levels, and so forth. For example, different regions within each cloud service provider (CSP) may be associated with different egress charges, and the egress charges may be tiered such that the per-byte charge is adjusted as the customer egresses more data. These egress charges can significantly increase costs for customers using the public cloud provider services. Thus, there is a need to optimize routing decisions to reduce costs when routing traffic across regions or CSPs.

Considering the foregoing, disclosed herein are systems, methods, and devices for autonomously optimizing traffic routing decisions to reduce costs within an egress-cost-based pricing model.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where:

FIG. 6 is a schematic flow chart diagram of a method for optimizing routing of a data package to reduce the total egress charge levied for routing the data package within a cloud computing network;

FIG. 7 is a schematic flow chart diagram of a method for provisioning network devices and compute devices within a cloud computing network to optimizing data package routing to reduce total egress charges levied against a customer of the cloud computing network;

DETAILED DESCRIPTION

Figure 1:
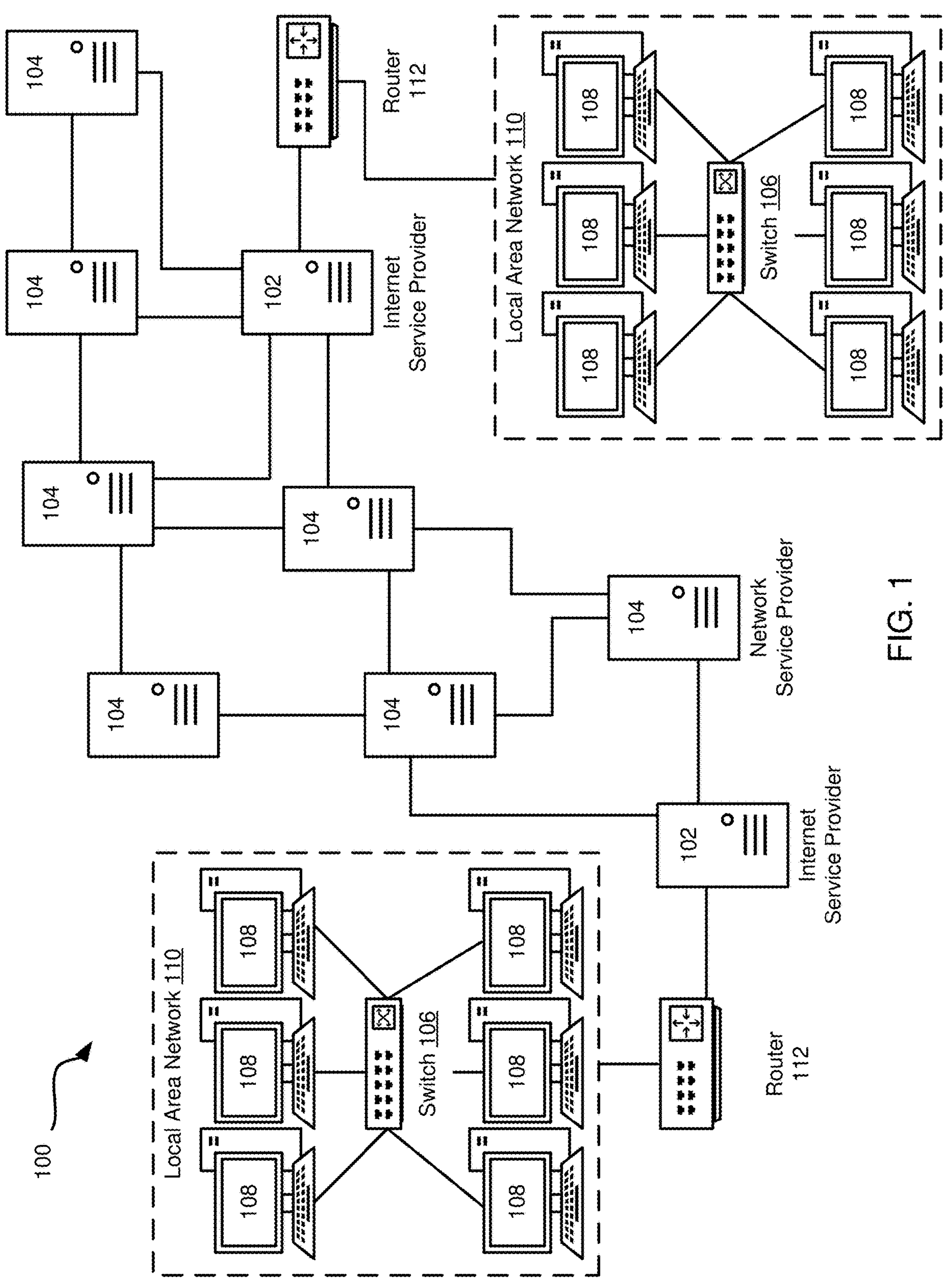
FIG. 1 is a schematic diagram of an example system of networked devices communicating over the Internet.

Disclosed herein are systems, methods, and devices for autonomously reducing the cost of traffic through a public cloud infrastructure. The systems, methods, and devices described herein are implemented to reduce total costs by optimizing traffic pathways based on the real-time cost of each egress location. The systems, methods, and devices described herein are specifically implemented to reduce the total egress charges levied against a customer of a cloud computing network, when the customer is charged according to an egress-based pricing scheme. The routing prioritization schemes described herein are configured optimize pathway selection based on total egress charges.

Numerous network-based applications microservice-based applications. Specifically, monolithic applications are becoming increasingly popular, and include a software architecture built as a single, self-contained unit. In this architecture, all components and features of the application are tightly interconnected and share the same codebase, database, and execution environment. Monolithic applications are often characterized by their simplicity, as all different functionalities are developed and deployed together. This move to microservice-based applications is facilitated by the public and private cloud. Because each application includes a collection of microservices, this facilitates development and deployment of applications in any public or private cloud.

In an example implementation, an application utilizes storage, compute, and artificial intelligence (AI) resources. A user may develop three microservices (i.e., storage, compute, and AI) in three different clouds. The storage microservice may utilize a cloud storage bucket. The compute microservice may reside in cloud computing services that are separate and independent from the cloud storage bucket. The AI microservice may reside in yet another cloud computing service that is separate and independent from the storage and the compute microservices. From a solution perspective, this distribution may represent an optimized usage of public cloud resources to develop the best solution for a customer.

However, public cloud providers are driven by a different objective. Public cloud providers seek to keep data within the cloud and charge customers on the amount of data that egresses the cloud provider (referred to as "egress data"). This creates a unique problem for distributed applications. Because the basic premise of a distributed application running within a single cloud or multi-cloud is distributed in nature, the cost of a distributed microservice-based application will quickly increase when deployed across distributed cloud operators. Each application has two primary issues to address, namely, getting the visibility into the cost ownership for cost centers such as sales, marketing, internal customers, and external customers. The systems, methods, and devices described herein are configured to optimize application traffic to reduce data egress costs and data transfer costs.

Many cloud providers permit customers to input data into the cloud for free. However, the cloud provider will then charge a significant fee to move that data out of the cloud network. These fees may be referred to as the egress cost and/or the data egress fee. Additionally, cloud providers may assess a fee when moving data between different regions or availability zones within the same cloud provider. These fees may be referred to as the data transfer fee.

Typically, cloud providers will bill customers for data egress charges in arrears. This can make it challenging to estimate or manage the data egress charges, and thus, these charges can quickly add up as different applications, workloads, and users consume, process, and extract data across different clouds or regions/services within the same cloud. These egress charges can significantly increase costs for customers using public cloud provider services. Thus, there is a need to optimize routing decisions to reduce costs when routing traffic according to an egress-based pricing model. The current network solutions and routing technologies do not account for these egress costs when computing the lowest cost path or the paths with the best SLA/service guarantees.

Data egress charges and data transfer fees create a unique problem for highly available applications that are distributed across different regions or availability zones within the same cloud provider or access services and data across different cloud-providers. Each such application has to primarily address 2 main issues-Getting visibility into the cost of running such an application and self-optimized automated routing of application traffic based on egress costs.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its destination. The routing table may further include quality of service associate with the route, links to filtering criteria lists associated with the route, interface for an Ethernet card, and so forth.

For hop-by-hop routing, each routing table lists, for all reachable destinations, the address of the next device along the path to that destination, i.e., the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause severe availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be noted that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all the functions normally performed by a router. However, some network switches are limited to supporting a single type of physical network, typically Ethernet, whereas a router may support various kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for diverse types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be noted that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. Considering the foregoing, disclosed herein are systems, methods, and devices for offloading best path computations to an external device to enable greater customizability in determining a best path algorithm that is well suited to a certain grouping of computers or a certain enterprise.

Figure 2:
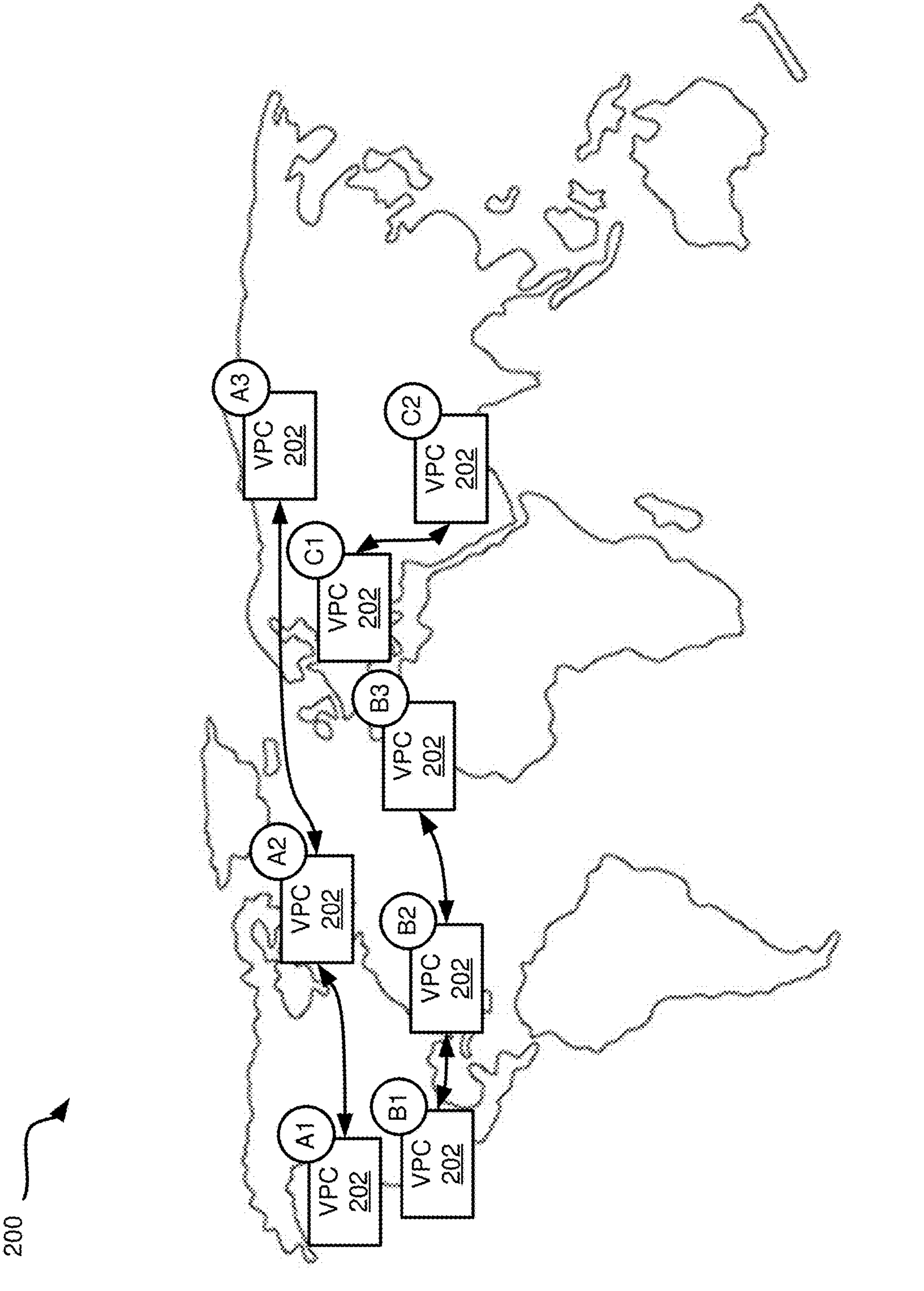
FIG. 2 is a schematic illustration of an example global routing configuration that includes three different cloud service providers.

FIG. 2 is a schematic illustration of a routing configuration 200 known in the prior art. The routing configuration 200 is executed irrespective of egress costs charged by various cloud providers. Utilizing the routing configuration 200 illustrated in FIG. 2 can result in an application provider paying excess costs for storage, compute, and AI microservices if those microservices are charged based on data egress.

A single application may utilize different virtual private clouds (VPC) 202 operated by different vendors. For example, a first VPC 202 vendor may provide cloud storage microservices, a second VPC 202 vendor may provide cloud compute microservices, and a third VPC 202 vendor may provide cloud artificial intelligence (AI) microservices. Each of the various VPC 202 vendors may separately charge based on data egress.

In the example routing configuration 200, an application utilizes Cloud Provider A (see VPC A1, VPC A2, and VPC A3), Cloud Provider B (see VPC B1, VPC B2, and VPC B3), and Cloud Provider C (see VPC C1 and VPC C2). As shown, each vendor may have a virtual private cloud 202 disposed in a different geographic location. For example, Cloud Provider A has a VPC 202 located around Seattle, USA (see VPC A1). This VPC 202 has two alternate paths to reach an end destination with Cloud Provider C in Ukraine (see VPC C1).

A first example path includes the following. The data package is initiated with Cloud Provider A at VPC A1. The data package is transmitted from VPC A1 to VPC B2, which results in an egress charge from transitioning between Cloud Provider A to Cloud Provider B. The data package is transmitted over the Cloud Provider B backbone to VPC B3. The data package then undergoes a second egress charge by egressing Cloud Provider B to Cloud Provider C when transmitted to a nearest region with Cloud Provider C. The data package then transmits to an end destination on the Cloud Provider C backbone at VPC C1. According to this pathway, the data package is charged for egress when transmitted from Cloud Provider A to Cloud Provider B, and again when transmitted from Cloud Provider B to Cloud Provider C.

A second example path includes the following. Again, the data package is initiated with Cloud Provider A at VPC A1. The data package then takes a direct path over the Cloud Provider A backbone to the nearest Cloud Provider A region in Ukraine (not shown in FIG. 2). The data package then experiences its first and only egress charge when it egresses from Cloud Provider A to the Cloud Provider C workload at VPC C1.

Even though the second example path has only one egress charge, based on the cloud provider's regional egress costs, it is possible the cost of two egress charges according to the first example path is less expensive than the single egress charge in the second example path.

Figure 3:
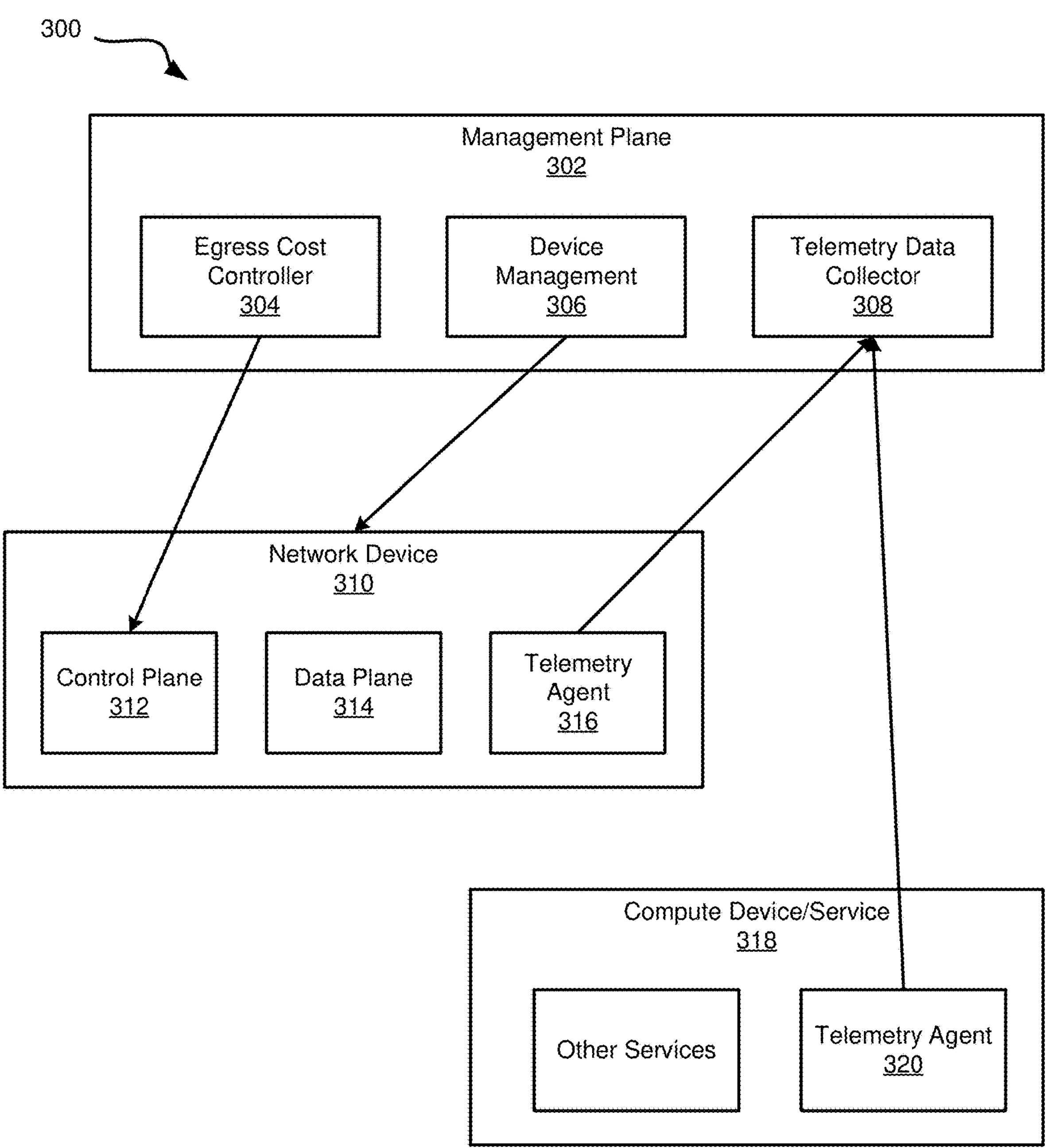
FIG. 3 is a schematic block diagram of a system that optimizes traffic routing to reduce costs according to an egress-based pricing model.

FIG. 3 is a schematic illustration of a system 300 for reducing costs in cloud-based applications that are charged according to egress-based pricing constructs. The system 300 includes a management plane 302 that includes an egress cost controller 304, a device management 306 module, and a telemetry data collector 308. The system 300 includes a network device 310 that includes a control plane 312, a data plane 314, and a telemetry agent 316. The system 300 includes a computer device/service 318 that configured to execute other services 320 and further includes a telemetry agent 322.

The egress cost controller 304 of the management plane 302 utilizes collected telemetry data to provide visibility into the amount of egress data or amount of data transferred between regions within the same cloud provider. The egress cost controller 304 tracks data transfers from each interface across virtual routing and forwarding (VRF) in every network device across multiple tenants. The egress cost controller 304 additionally tracks data transfers from one cloud region or availability zone to another within the same cloud provider, and from one cloud provider to another cloud provider. The egress cost controller 304 categorizes traffic across different cost centers to display data generated by various functional units within the overlay network, and additionally displays egress costs by functional units. This provides visibility for users to understand how to budget resources within various functional units. Additionally, the egress cost controller 304 configures network devices 310 and compute devices/services 318 to optimize cost and reduce egress charges considering the costs associated with the egress-based pricing scheme associated with various cloud providers. The egress cost controller 304 additionally queries the cloud provider Application Program Interface (API) to determine the real-time costs for egressing at each applicable location. The egress cost controller 304 additionally monitors per-tenant costs across all network devices 310. The egress cost controller 304 programs egress costs into the routing protocols utilized by the network devices 310.

The device management 306 module of the management plane 302 is configured to manage the network devices 310, including provisioning and deploying the network devices 310. The device management 306 module additionally manages the operations and maintenance of the network devices 310 by monitoring those network devices 310. Additionally, the device management 306 module monitors the visibility into how each network device 310 is connected, and which compute device/instance is connected to each network devices 310.

The telemetry data collector 308 of the management plane 302 collects telemetry data from network devices 310 and compute devices/services 318.

The network device 310 is a network device that can route data traffic in the cloud and impact the path the data takes from source to destination. The control plane 312 of the network device 310 makes routing decisions based on various routing protocols. The control plane 312 may operate according to, for example, Border Gateway Protocol (BGP), Open Shortest Path First (OSPF), Intermediate System to Intermediate System (ISIS), or static routing. Most cloud service providers utilize BGP as the routing protocol to peer with other networking devices in the overlay network. BGP relies on an Interior Gateway Protocol (IGP) such as OSPF or static routing to find the best possible paths. The BGP Routing Information Base (RIB) has multiple paths to the same destination and will select the optimal path based on the configured routing policies. The BGP best path to reach a destination next hop is selected based on various parameters such as local preferences, Multi-Exit Discriminator (MED), weight, Autonomous System (AS) path, and so forth. Routing policies can be applied to influence any of the metrics, and these metrics in turn impact the routing decisions taken by BGP. When the best path is calculated, the path is injected into the Linux Kernel Forwarding Information Base (FIB) and the packets are routed based on the next hop residing in the FIB. The device management 306 module of the management plane 302 instructs the network device 310 to implement routing protocols such as BGP, OSPF, IS-IS in a cost-aware fashion and to make decisions based on actual egress costs of the interface.

The data plane 314 of the network device 310 supports v4 and v6 native forwarding and various tunneling protocols such as Generic Routing Encapsulation (GRE), Internet Protocol Security (IPSec), or Segment Routing version 6 (SRv6) to overcome transport limitations in the network. The control plane 312 and data plane 314 implement egress cost controller programs for route metrics for most optimal path selection such that the path selected minimizes the total egress costs between sources and destinations.

The telemetry agent 316 of the network device 310 forwards telemetry data to the telemetry data collector 308 of the management plane 302.

The compute device/service 318 refers to any cloud provider resources that send and receive data traffic such as a compute instance, storage instance, NAT gateway, Internet gateway, and so forth. The telemetry agent 320 of the compute device/service 318 forwards telemetry data to the telemetry data collector 308 of the management plane 302.

There are at least two use-cases wherein a multi-cloud network platform may provide multi-cloud connectivity to internal and/or external customers. Internal customers may be internal to an organization, such as internal business units like sales, marketing, engineering, customer support, and so forth. Typically, internal customers will consume shared services in the cloud, including, for example, a cloud firewall. An enterprise administrator may wish to know which internal business unit is consuming the most cloud firewall, who is sending the most egress traffic, and so forth. External customers may include outside organizations utilizing a multi-cloud provider. The multi-cloud provider typically charges the external customers based on consumption. Thus, the multi-cloud provider may generate cost centers to track the consumption of each external customer.

The system 300 obtains visibility into the costs incurred by a customer. Each computing device 108 can stream telemetry data to the management plane 302. The management plane 302 collects the telemetry data to achieve visibility into how much data egresses from each computing device 108 within the overlay/underlay network. Telemetry data can be collected for each interface (physical or logical) of the data plane 314 and control plane 312 of a network device 310 and across different Virtual Routing and Forwarding instance (VRFs) in a multi-tenant deployment. Cost centers established in the management plane 302 categorize traffic based on tags (e.g., marketing, sales, engineering, and so forth) to display data generated by various functional units within the overlay network. Functional units may include subdivisions of a single organization or may each correspond to an individual external customer or subdivision of an external customer. This provides visibility for users to understand how to budget resources within various functional units.

When the system 300 has visibility into the egress-based costs, the system 300 is then configured to optimize costs and reduce egress charges. Most cloud service providers utilize BGP as the routing protocol to peer with other networking devices in the overlay network. BGP relies on an Interior Gateway Protocol (IGP) such as OSPF or static routing to find the best possible paths. The BGP Routing Information Base (RIB) has multiple paths to the same destination and will select the optimal path based on the configured routing policies. The BGP best path to reach the destination is selected based on various parameters such as local preference, Multi-Exit Discriminator (MED), weight, Autonomous System (AS) path, and so forth. Routing policies can be applied to influence any of the metrics, and these metrics in turn affect the routing decisions taken by BGP. When the best path is calculated, the path is injected into the Linux Kernel Forwarding Information Base (FIB) and the packets are routed based on the next hop residing in the FIB.

Figure 4:
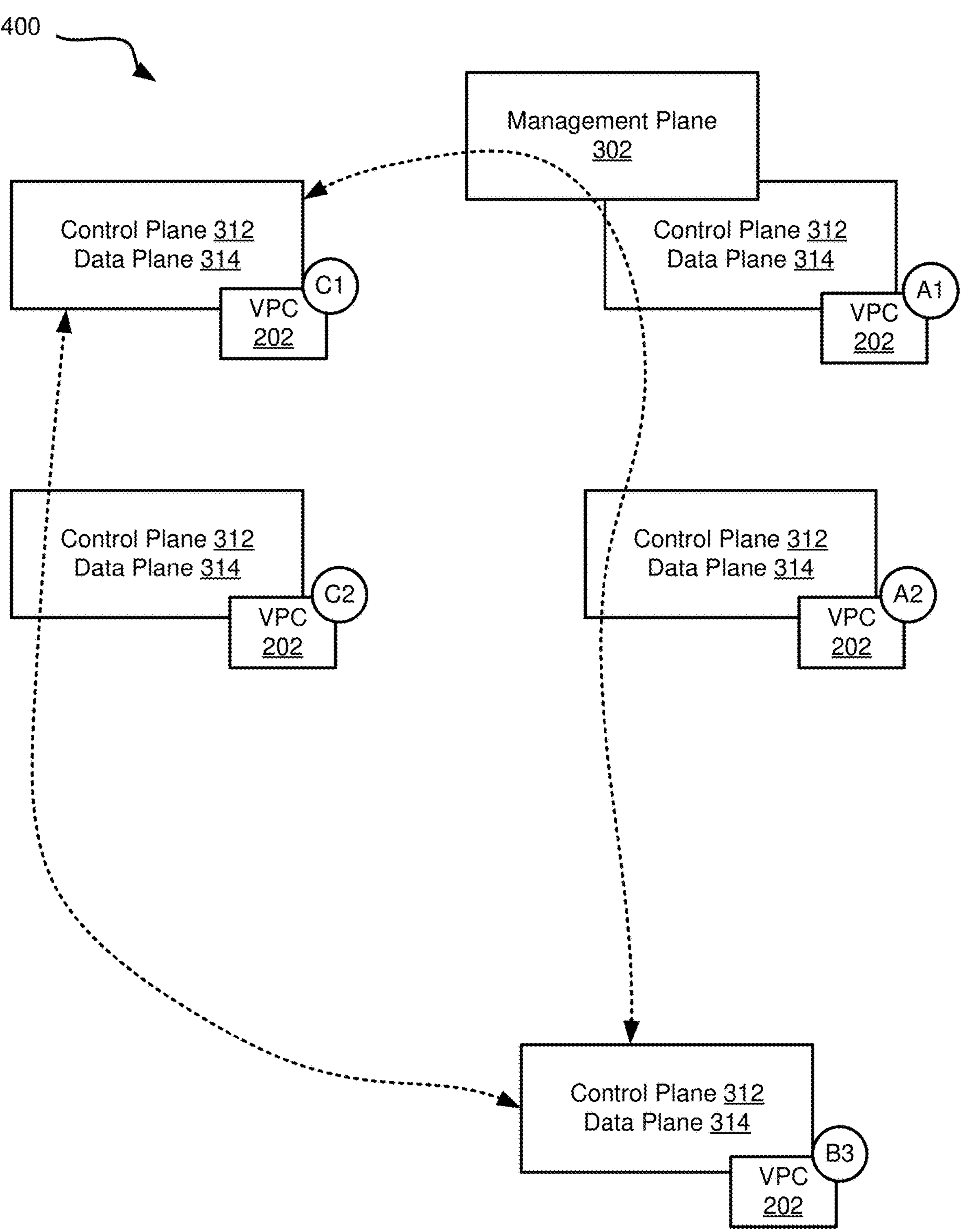
FIG. 4 is a schematic block diagram of an example routing configuration for reducing cost when routing with an egress-based pricing mode.

FIG. 4 is a schematic block diagram of an example routing configuration 400 that reduces costs by selecting a route to a destination that minimizes egress charges incurred from source to destination. The routing configuration 400 is implemented for per-tenant or customer-based usage metering. The routing flow is based on Source-Destination total egress costs from end to end, and this will further depend on the real-time egress costs for each virtual private cloud 202 location. The routing configuration allows 400 to overrides interface costs to lower the cost for the interface transmitting to a dedicated connection. The systems described herein implement the routing configuration 400 by monitoring per-tenant cost across all network devices 310 managed by the management plane 302. Egress costs can affect (BGP) route metrics for most optimal path selection such that the path selected minimizes total egress costs between a source and a destination.

A process flow begins with one or more of the control plane 312 or the data plane 314 booting up in a public cloud. The public cloud may include any suitable public cloud or cloud-based services provider. Example public clouds include Amazon Web Services®, Microsoft Azure®, Google Cloud Platform® (CSP), and Oracle Cloud Infrastructure®. The management plane 302 queries the cloud provider Application Program Interface (API) to find out the real-time costs for egressing at each applicable location. The management plane 302 controls deployment of the control plane 312 and the data plane 314. Additionally, the management plane 302 communicates with the network device 310 to inform the control plane 312 and/or the data plane 314 of the egress costs per-interface for that node in the cloud region where the network device 310 resides. Thus, upon bootup, the control plane 312 and the data plane 314 know the region, cloud provider, and the subnets where its interfaces are connected. Because tunneling interfaces are also encapsulated using the underlaying source/destination IP address, the cost of using tunneling interfaces is known to the control plane 312 and the data plane 314 of each network device 310.

The routing protocol is programmed by one or more of the control plane 312 or the data plane 314 for each network device 310. The cost associated with each network device 310 may be referred to as the "base cost." This base cost is the cloud egress costs for each Gb of traffic that will exit the virtual router. After the virtual router, there can be additional network devices 310, e.g., an Internet Gateway, a NAT GW, or a service GW. These network devices 310 may also have a per Gbps charge. This additional network device 310 egress charge is the variable costs that have to be added to the base cost described above.

In the example routing configuration 400, the control plane 312 and the data plane 314 are associated with Cloud Provider A at VPC A1, which has two interfaces connected to a public subnet using an IGW and another public subnet using a NAT gateway. To calculate the base cost of the interface, assume a cost of 5 cents/GB. The management plane 302 knows how each network device 310 is connected. Further to the example, the management plane 302 knows the network device 310 is connected to IGW and a NAT gateway on two different interfaces.

By using tags for each interface on the control plane 312 and the data plane 314, the management plane 302 updates the base cost for each interface. For example, the interface connected to IGW has a variable cost of 1 cent/GB, and the interface connected to the NAT gateway has a variable cost of 3 cents/GB. The total cost of each interface of the management plane 302 is the sum of the base cost and the variable cost. Further to the example, the total cost will be 6 cents/GB for using the interface connected to IGS and 8 cents/GB for using the interface connected to the NAT gateway.

The underlying IGP protocol (e.g., OSPF) or a static configuration will make a cost database per management plane 302 node. The cost of multiple next hops to reach a destination will be calculated in the RIB. The routing protocol factors cost as another parameter to make the routing decision and to choose which next hop to inject into the kernel. If BGP arrives at the decision that the cost through both the interface is the same, Equal Cost Multipath (ECMP) rules may also be applied.

The routing configuration 400 enables numerous advantages, including the following. Networking protocols like BGP become egress cost aware and will make decisions based on the actual egress costs of the interface. The costs for distributed microservice applications may now be optimized by the network instead of the application developer being made aware of the underlying network. The application developer can thus focus on business value rather than optimizing how traffic flows through the underlying network. Customer benefit by reducing egress charges when the underlying protocols make intelligent routing decisions to optimize egress costs. Additionally, customers have a mechanism to override the cost of an interface and make it minimum or zero when they know the interface traffic is going over a dedicated connection toward their datacenter. Dedicated connections have fixed costs per month, and thus they can be considered as sunk costs or zero costs for dynamic routing purposes.

Figure 5:
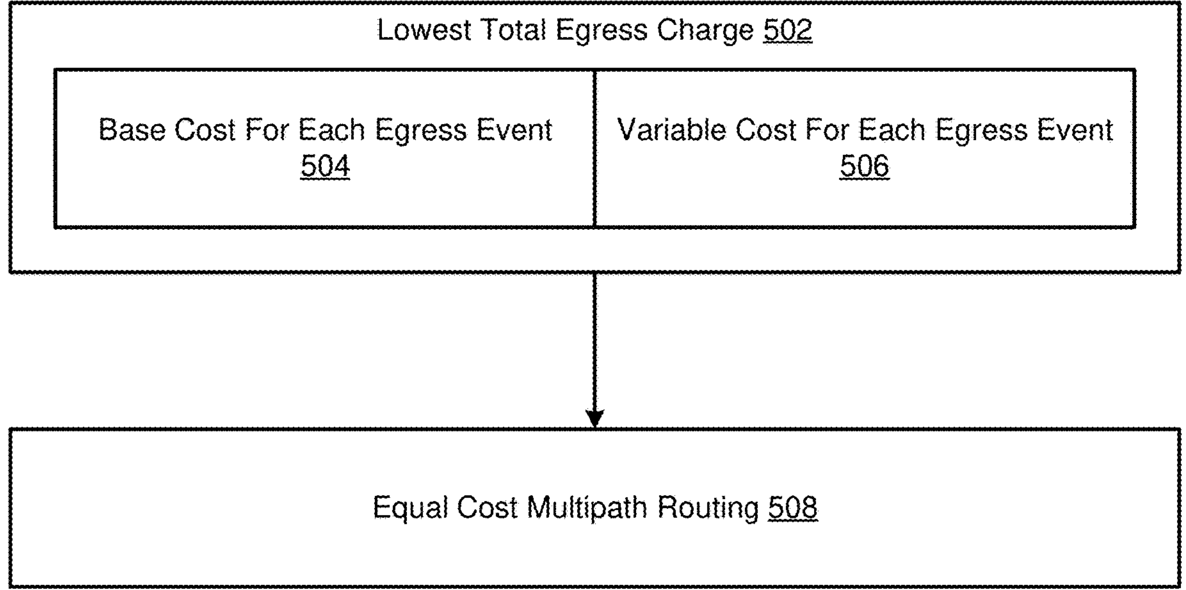
FIG. 5 is a schematic block diagram of a routing prioritization for reducing a total egress charge levied against a customer of a cloud computing network.

FIG. 5 is a schematic block diagram of a routing prioritization 500 schema that reduces the total egress charges levied against a customer of a cloud computing network, when the customer is charged according to an egress-based pricing scheme. The routing prioritization 500 is implemented when selecting a pathway for routing a data package from a source address to a destination address.

The routing prioritization 500 includes identifying a plurality of paths for routing a data package from a source address to a destination address. The plurality of possible pathways may include one or more pathways that route between different but interconnected cloud computing networks. For example, a first possible routing pathway may include an egress from Network Provider A to Network Provider B, and then an egress from Network Provider B to Network Provider C, and then another egress from Network Provider C back to Network Provider A. This first possible routing pathway includes multiple egress events between different network providers of different (but interconnected) cloud computing networks. Other possible routing pathways may include more or fewer egress events between network providers. The routing prioritization 500 is executed after calculating a total egress charge for each of the possible routing pathways. The total egress charge for each pathway is determined based on the base cost and variable cost levied by each cloud network provider. These costs may be retrieved in real-time by way of an API to each of the plurality of cloud network providers.

The routing prioritization 500 optimizes the path selection by selecting the path with the lowest total egress charge 502. The lowest total egress charge 502 is measured in currency and may specifically be measured in the currency to be paid by the customer to the one or more cloud network providers. The lowest total egress charge 502 includes the base cost for each egress event 504 occurring within the pathway, and additionally includes the variable cost for each egress event 506 occurring within the pathway. The base cost refers to a non-variable per-Gb cost for egressing data from a certain region, cloud network provider, or underlay interface. The variable cost refers to a variable per-Gb cost for egressing data from a cloud providers network devices e.g. Internet GW, NAT GW or any GW that allows egress from CSP in a certain region, cloud network provider, or underlay interface. The variable cost may vary depending on, for example, the time of day, the amount of data currently being routed, the amount of data previously routed by the customer within a billing cycle, and so forth.

If only one possible pathway has the lowest total egress charge 502, then the routing prioritization 500 schema indicates that one possible pathway should be selected. However, if two or more possible pathways have an equivalent lowest total egress charge 502, then the routing prioritization 500 schema then selects a pathway according to equal cost multipath (ECMP) routing 508 protocols.

FIG. 6 is a schematic flow chart diagram of a method 600 for optimizing data package routing decisions to reduce egress charges levied against a customer within a cloud computing network. The method 600 may specifically be executed by a control plane 312 or data plane 314 of a network device 310.

The method 600 includes querying at 602 a cloud network API to retrieve an egress-based pricing scheme. The querying at 602 may be separately performed for each of a plurality of providers associated with a plurality of interconnected cloud computing networks. The querying at 602 may be performed only for one provider of one cloud computing network that charges a customer for data movement. The querying at 602 may be performed by the network device 310 upon startup or at regular intervals.

The method 600 includes determining at 604 one or more of a region, a cloud computing network provider, or a subnet that is connected to one or more interfaces of the network device 310. The one or more interfaces of the network device 310 may specifically include underlay interfaces. In various implementations, the network device 310 may be provisioned with one or more underlay interfaces connecting the network device 310 to various geographical regions, cloud computing network providers, and subnets. The determining at 606 may be performed by the network device 310 upon startup or at regular intervals.

The method 600 includes identifying at 606 a plurality of paths for routing a data package from a source address to a destination address. The plurality of paths may be determined according to BGP protocols. The method 600 includes calculating at 608 a total egress cost for each of the plurality of paths. The total egress cost for each path is the sum of the one or more total egress charges for that path, wherein each of the one or more total egress charges is associated with an egress event occurring within the path. Each of the one or more total egress charges (for each egress event within the path) is the sum of the base egress charge and the variable egress charge for that egress event. These charges will be determined based on the up-to-date egress-based pricing scheme levied against each cloud computing network provider.

The method 600 includes selecting at 610 a least expensive path comprising a lowest total egress cost. The selecting 610 may include selecting irrespective of whether the least expensive path (with the lowest total egress cost) includes the fewest quantity of hops, a shortest distance traveled, the least amount of compute resources used, and so forth. If two or more pathways have the same total egress cost, then the method 600 may include selecting amongst the two or more pathways with the same lowest total egress cost according to ECMP routing protocols.

FIG. 7 is a schematic flow chart diagram of a method 700 for provisioning one or more of a network device or a compute device to optimize routing decisions to reduce a predicted data egress charge for a customer. The method 700 may be performed by a management plane 302 in communication with one or more network devices 310 and compute devices/services 318.

The method 700 includes receiving at 702 telemetry data from one or more of a network device or a compute device within a cloud computing network. The telemetry data is associated with a customer of the cloud computing network. The cloud computing network may include one network hosted by one provider. The cloud computing network may include a plurality of interconnected cloud computing networks that are hosted by a plurality of providers. The method 700 includes retrieving at 704 an egress-based pricing scheme associated with a provider of the cloud computing network. The retrieving at 704 may include retrieving an independent egress-based pricing scheme for each of the plurality of providers of the plurality of interconnected cloud computing networks. The method 700 includes provisioning at 706 one or more of the network device or the compute device to optimize routing decisions for the customer to reduce a predicted data egress charge for the customer. The provisioning at 706 may include instructing the one or more of the network device or the compute device to execute any of the cost-aware routing protocols described herein.

Figure 8:
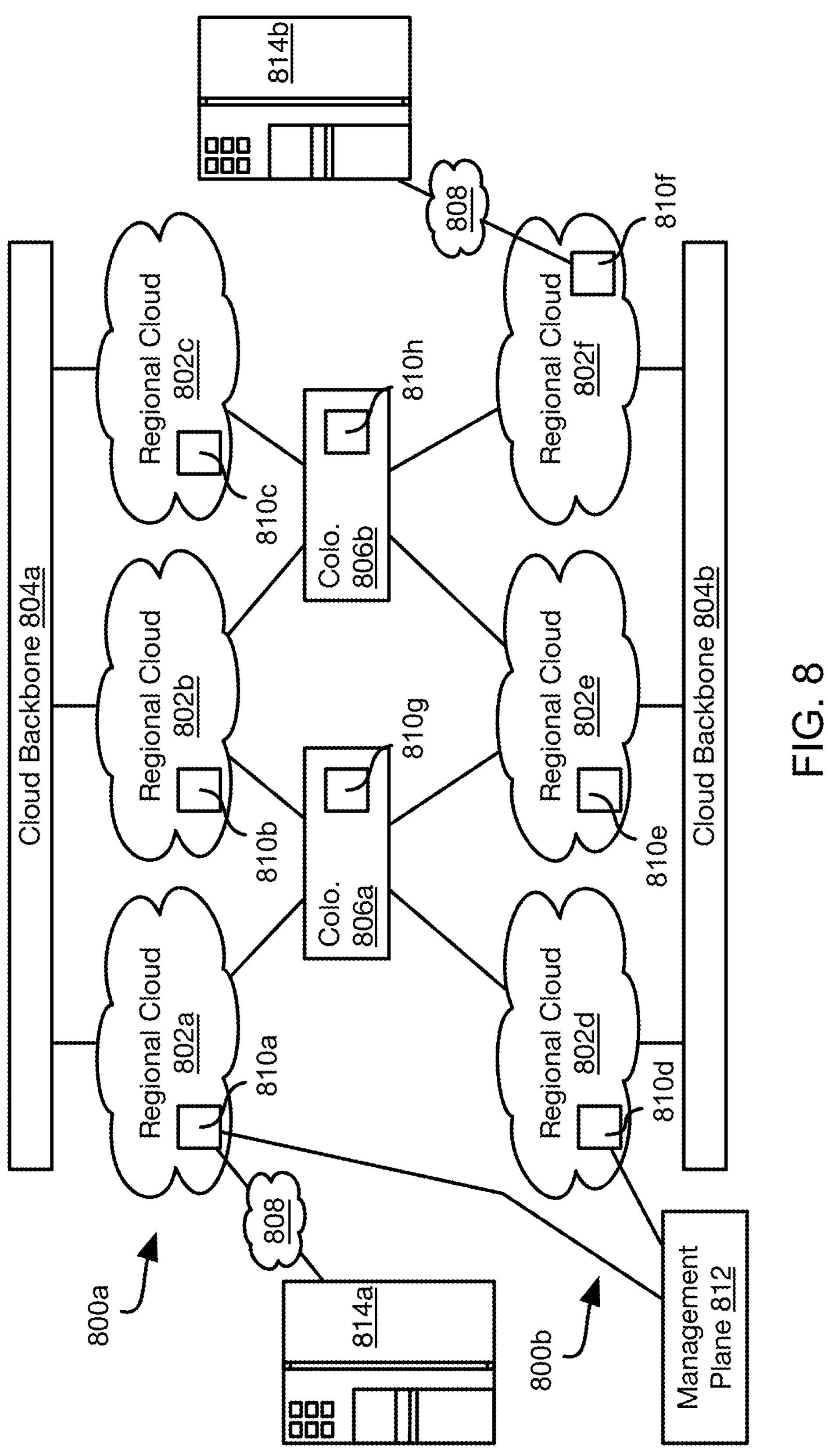
FIG. 8 is a schematic diagram of multiple clouds and other components across which traffic may be routed in a cost-aware manner in accordance with an embodiment of the present invention.

Referring to FIG. 8, there may be any number of CSPs 800*a*, 800*b* available for use by a customer, such as AMAZON WEB SERVICES (AWS), MICROSOFT AZURE, GOOGLE CLOUD PLATFORM (GCP), ORACLE CLOUD INFRASTRUCTURE (OCI), or the like. Each of these may have different costs in terms of computational resources, memory, storage, egress charges, and transfer charges for moving data into the CSP (ingress charges), out of the CSP (egress charges), or across different portions of the CSP (transfer charges).

For example, a cloud 800*a* may include regional clouds 802*a*, 802*b*, 802*c* that are connected to one another by one or more cloud backbones 804*a*. Transfer of data between regional clouds 802*a*, 802*b*, 802*c* may incur transfer charges. Data may be transferrable into and out of a regional cloud 802*a*, 802*b*, 802*c* using a point of presence (POP) implemented by the regional cloud 802*a*, 802*b*, 802*c*, the use of which incurs ingress and/or egress charges. In some implementations, movement of data within a regional cloud does not incur additional charges.

Another cloud 800*b* may function as described above with respect to the cloud 800*a* and may include its own regional clouds 802*d*, 802*e*, 802*f* connected to one another by a corresponding one or more cloud backbones 804*b*. The regional clouds 802*d*, 802*d*, 802*f* may likewise be accessible through POPs as described above with respect to the cloud 800*a*.

In some implementations, a cloud backbone 804*a*, 804*b* and possibly a POP of one or more clouds 800*a*, 800*b* may be bypassed using any number of colocation providers 806*a*, 806*b*. A colocation provider 806*a*, 806*b* may provide networking infrastructure connected to multiple clouds 800*a*, 800*b* and multiple regional clouds 802*a*-802*f* of multiple clouds 800*a*, 800*b*. The costs for transferring data from a regional cloud 802*a*-802*f* to a colocation provider 806*a*, 806*b* and the cost for transferring data from a colocation provider 806*a*, 806*b* to a regional cloud 802*a*-802*f* may be different (typically less) than typical ingress and egress charges of the clouds 800*a*, 80*b*. Likewise, the cost of transferring data using a colocation provider 806*a*, 806*b* rather than a cloud backbone 804*a*, 804*b* may be different (typically less). For example, the cost of transferring data between regional clouds 802*a*-802*f* of the same cloud 800*a*, 800*b* by way of a colocation provider 806*a*, 806*b* (including ingress and egress charges of the cloud 800*a*, 800*b* and transfer charges of the colocation provider 806*a*, 806*b*) may be less than doing so using a cloud backbone 804*a*, 804*b* of the cloud 800*a*, 800*b*. Any of one or more clouds 800*a*, 800*b* and one or more colocation providers 806*a*, 806*b* constitute computing infrastructure elements that may be used to provide a route between computing devices that are remote from one another.

An arbitrary route through any number of clouds 800*a*, 800*b*, regional clouds 802*a*-802*f*, cloud backbones 804*a*, 804*b* and colocation providers 806*a*, 806*b* may be implemented using virtual routers 810*a*-810*h* hosted in the regional clouds 802*a*-802*f* and/or colocation providers 806*a*, 806*b*. In the illustrated example, virtual routers 810*a*-810*h* are hosted in each regional cloud 802*a*-802*f* and/or colocation provider 806*a*, 806*b*. However, in many instances, a network path may include one or more regional clouds 802*a*-802*f* and/or colocation providers 806*a*, 806*b* that do not host a virtual router 810*a*-810*h*. In such instances, routing through the regional cloud 802*a*-802*f* and/or colocation provider 806*a*, 806*b* that lacks a virtual router 810*a*-810*h* may be performed using networking protocols implemented by the regional cloud 802*a*-802*f* and/or colocation provider 806*a*, 806*b*.

The virtual routers 810*a*-810*h* may implement one or more virtual local area networks (VLANs) implemented on top of networking protocols implemented by the clouds 800*a*, 800*b* and/or colocation providers 806*a*, 806*b*. The virtual routers 810*a*-810*h* may be connected to one another by way of protocol tunnels (e.g., virtual private network (VPN) tunnels) implemented on top of networking protocols implemented by the clouds 800*a*, 800*b* and/or colocation providers 806*a*, 806*b*. In some embodiments, inter-VLAN routing may be performed by a router located at a colocation provider 806*a*, 806*b*. In some embodiments, routers in a cloud 800*a*, 800*b* perform only L3 routing. In some embodiments a direct connect gateway (GW) in cloud 800*a*, 800*b* creates a VLAN that terminates at a virtual router 810*b*, 810*h* executed by a colocation provider 806*a*, 806*b*. These virtual routers 810*b*, 810*h* may then perform inter-VLAN routing with respect to VLANs 810*a*-810*f* executing in one or more clouds 800*a*, 800*b*.

As discussed in greater detail below, the provisioning, configuration, and monitoring of the virtual routers 810*a*-810*h* may be performed by a management plane 812 that is in network communication with some or all of the virtual routers 810*a*-810*h*. The management plane 812 may be implemented by one of the clouds 800*a*, 800*b* and/or colocation providers 806*a*, 806*b* or a separate computing device.

Computing devices 814*a*, 814*b* may communicate with one another over network paths through the clouds 800*a*, 800*b* and/or colocation providers 806*a*, 806*b* defined by the management plane 812 in accordance with route decision criteria specified by an entity owning or controlling the computing devices 814*a*, 814*b*. The decision criteria may include requirements regarding, cost, latency, throughput, jitter, packet loss, or other factors as discussed in greater detail below.

The computing devices 814*a*, 814*b* may connect to the clouds 800*a*, 800*b* and/or colocation providers 806*a*, 806*b* directly or by way of a network 808, such as a local area network (LAN), wide area network (WAN), the Internet, or other type of network. The computing devices 814*a*, 814*b* may connect to the clouds 800*a*, 800*b* and/or colocation providers 806*a*, 806*b* using wired, fiberoptic, or wireless networks.

Figure 9:
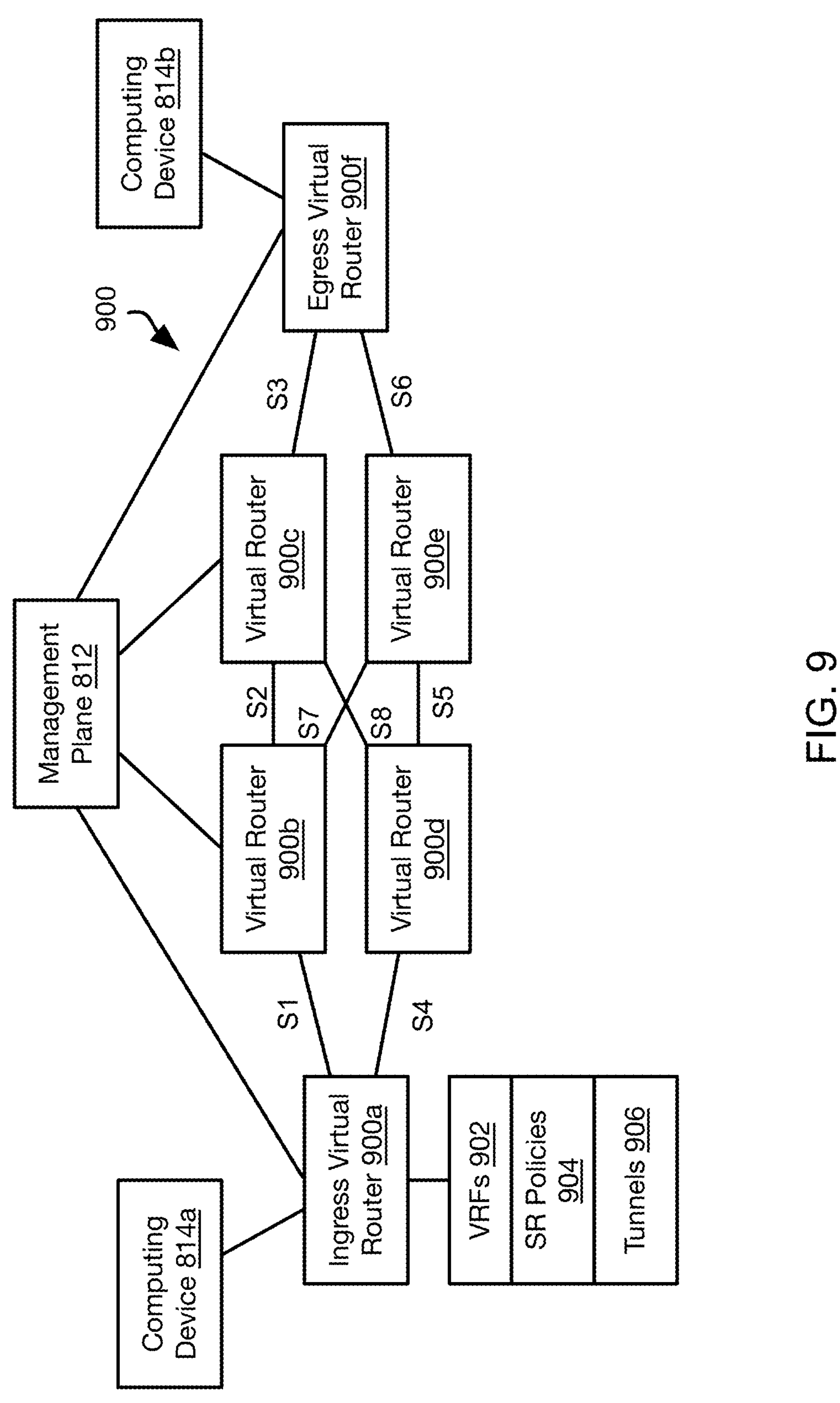
FIG. 9 is a schematic diagram illustrating an example configuration of virtual routers and segment identifiers for facilitating routing in a cost-aware manner in accordance with an embodiment of the present invention.

FIG. 9 illustrates an example VRF 900 that may be implemented using virtual routers 810*a*-810*h* distributes across any number of regional cloud 802*a*-802*f* and/or colocation provider 806*a*, 806*b*. In particular, the illustrated virtual routers 900*a*-900*f* of the illustrated VRF 900 may be implemented by any of the virtual routers 810*a*-810*h* hosted by any regional cloud 802*a*-802*f* and/or colocation provider 806*a*, 806*b*.

The VRF 900*a* may include an ingress virtual router 900*a* that receives data transmitted by a computing devices 814*a* directly or by way of an intermediate network 808. The ingress virtual router 900*a* is connected to one or more intermediate virtual routers 900*b*, 900*c*, 900*d*, 900*e*. The data may exit the VLAN through an egress router 900*f* connected to one or more of the intermediate routers 900*b*, 900*c*, 900*d*, 900*e*. The egress router 900*f* transmits the data to a computing device 814*b* referenced by the destination address of the data. The egress router 900*f* may transmit the data to the computing device 814*b* directly or by way of an intermediate network 808. The illustrated roles of the virtual routers 900*a*-900*f* are exemplary only and any virtual router 900*a*-900*f* may act as an ingress, egress, or intermediate virtual router.

The VRF 900 may implement a segment routing protocol, such as segment routing version 6 (SRv6). Accordingly, each network path of a plurality of network paths may be assigned segment identifiers (SID) S1-S8. A segment identifier identifies a path between nodes of the VRF 900, such as between pairs of virtual routers 900*a*-900*f*. In the illustrated VRF 900, each SID defines a path between a pair of virtual routers 900*a*-900*f*. However, an SID may also define a path that passes through multiple virtual routers 900*a*-900*f* or through portions of a cloud 800*a*, 800*b* or colocation provider 806*a*-806*b* lacking a virtual router.

A virtual router acting as the ingress router 900*a* may include various data structures to facilitate routing of data through the VRF 900. These data structures may be configured by the management plane 812 to facilitate cost-aware routing according to the approach described in greater detail below. The data structures may include a virtual routing table 902. The virtual routing table 902 may define a routing table associating with a VRF ID. In some embodiments, only L3 routing through clouds 800*a*, 800*b* (e.g., no L2) is implemented. However, where inter-VLAN routing is implemented by a colocation provider 806*a*, 806*b*, as described above, L2 routing may be performed.

The data structures may include one or more segment routing (SR) policies 904. A routing table for a VRF ID may associate a SR policy 904 with a destination address such that packets addressed to the destination address and referencing the VRF ID will be routed according to the SR policy. Each SR policy 904 may include a sequence of SIDs defining a path through the VRF 900. For example, the SIDs may include any of the illustrated SIDs S1-S8. The SR policy 904 may further include service SIDs. A service SID may reference an executable, application, or routing action to be performed with respect to packets labeled with the service SID. For example, a service SID may define behavior to be performed by the egress router 900*f* in order to route a packet to the destination computing device 814*b* by way of an intermediate network 808.

The data structures may include one or more tunnels 906. Packets transmitted through the VLAN may be transmitted within one or more protocol tunnels, such as generic routing encapsulation (GRE), internet protocol secure (IPsec) tunnel, virtual private network (VPN) tunnel, or any other type of tunnel. Any of the proceeding tunnels may be implemented using SRv6 transport over sequences of one or more SIDs. The tunnel may originate at the ingress virtual router 900*a* and be terminated by the egress virtual router 900*f*.

Figure 10:
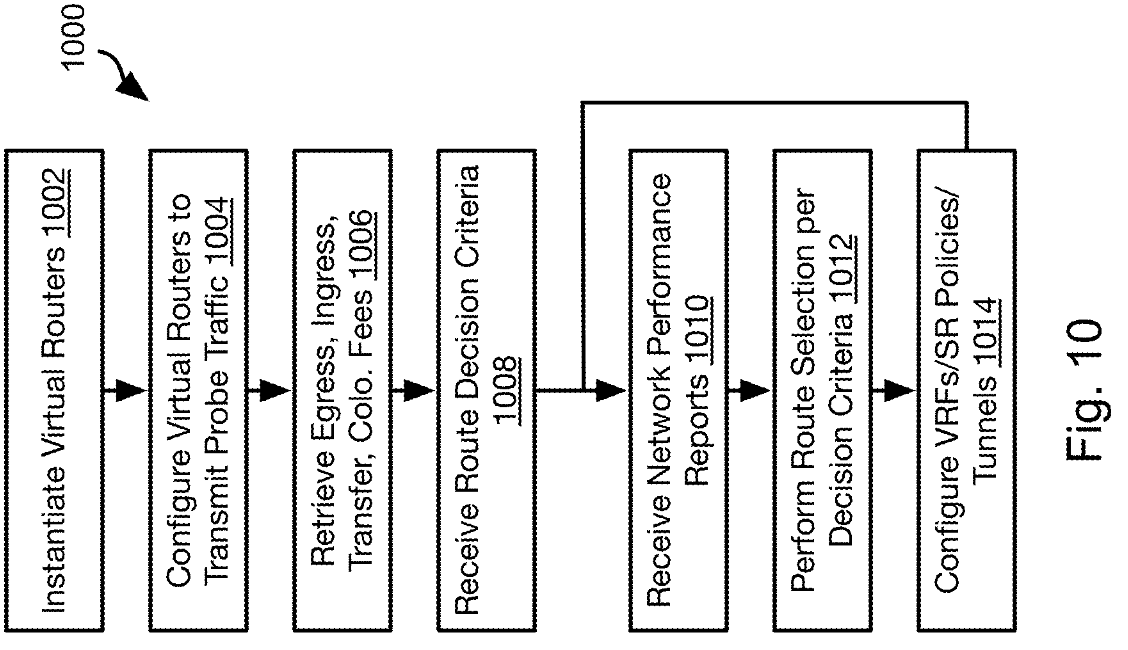
FIG. 10 is a process flow diagram of a method for configuring virtual routers for facilitating routing in a cost-aware manner in accordance with an embodiment of the present invention.

FIG. 10 illustrates a method 1000 that may be executed by the management plane 812. The method 1100 may include instantiating 1002 virtual routers 810*a*-810*h* in one or more regional clouds 802*a*-802*f* and/or colocation providers 806*a*, 806*b*. The virtual routers 810*a*-810*h* may be instantiated preemptively or may be instantiated as needed (see FIG. 12 and corresponding discussion).

The virtual routers 810*a*-810*h* may be configured 1004 to transmit probe traffic 1004. For example, in the example of FIG. 9, each virtual router 900*a*-900*f* may transmit probe traffic for each SID S1-S8 representing a path originating from that virtual router 900*a*-900*f*. For example, virtual router 900*b* may transmit probe traffic along paths represented by S2 and S7 to virtual routers 900*c* and 900*e*. Probe traffic may include transmitting ping messages, two-way active measurement protocol (TWAMP) or any other transmission that may be used to measure the latency (e.g., round trip time), throughput, jitter, loss, or other property of a network connection. Probe traffic may be sent periodically and/or according to a predefined schedule. Probe traffic may additionally or alternatively be transmitted in response to a triggering event, such as loss of packets, incrementing of drop counters, route changes, loss reported by application counters, change to a network (e.g., adding or removing a virtual router) or other triggering events.

The method 1000 may include retrieving 1006 fee-related information for some or all of the clouds 800*a*, 800*b* and colocation providers 806*a*, 806*b* that may be used. The fee-related information may include some or all of:

- Standard Internet egress charges
- Cloud provider intra- and inter-continental region transfer.
- CSP Egress (per Gbps) charges for dedicated connections (AWS-DirectConnect, Azure ExpressRoute, GCP interconnect, OCI FastConnect, etc.)
- Egress transfer charges to colocation providers
- Colocation provider charges from a source to various destinations
- Egress charges on cloud provider backbone network (AWS CloudWAN, Azure CloudWAN, GCP NCC, etc.)

The fee-related information may include time-dependency: some or all of egress charges, ingress charges, transfer charges, or other fees may be different for different times of day. The fee-related information may include time-dependency: some or all of egress charges, ingress charges, transfer charges, or other fees may be different for different times of day. The fee-related information may include quantity-dependency: some or all of egress charges, ingress charges, transfer charges, or other fees may be change with the amount of data transmitted within a given time period. Step 1006 may include retrieving the fee-related information from an entity managing a cloud 800*a*, 800*b* or colocation provider 806*a*, 806*b*. Step 1006 may include retrieving the fee-related information from a database hosted by or accessed by the management plane 812.

The method 1000 may include receiving 1008 route decision criteria. The route decision criteria may be received from an entity owning, controlling, or using the services of a computing device 814*a* that will transmit data over the VRF 900 VLAN 900. The route decision criteria may include some or all of a minimum latency, minimum throughput, maximum total cost (e.g., for costs incurred from ingress to egress of the VRF 900), maximum jitter, maximum packet loss, or any other property of data transmission along a route. The route decision criteria may include time dependency: different route decision criteria for different times of day, different days of the week, or other time period. The route decision criteria may be specified for a particular ingress point and egress point in one or more cloud 800*a*, 800*b* and/or colocation provider 806*a*, 806*b*, e.g., a particular POP of a particular regional cloud 802*a*-802*f* or colocation provider 806*a*, 806*b* or other physical interface to a cloud 800*a*, 800*b* and/or colocation provider 806*a*, 806*b*. In some instances, route decision criteria may be specified for a particular ingress virtual router 900*a* and a particular egress virtual router 900*f*, i.e. specify criteria for selecting a route between the ingress virtual router 900*a*, 900*f*. There may be multiple sets of decision criteria for the same ingress virtual router 900*a* and egress virtual router 900*f*. For example, there may be a low latency (high cost) set of decision criteria, a high throughput (high cost) set of decision criteria, a low cost (high latency) set of decision criteria, a neutral (intermediate cost) decision criteria. As described below, a VRF may be used to route traffic along different routes selected according to the different sets of decision criteria. A set of decision criteria may be represented as a function that receives values for network connection properties and costs of a route and outputs a fitness value or a binary decision (acceptable, not acceptable).

The method 1000 may include receiving 1010 network performance reports. The network performance reports may be the result of probe traffic sent out by virtual routers

810*a*-810*h*. The network performance reports may report properties of a physical connection between pairs of virtual routers 810*a*-810*h*. For example, the network performance reports may report the properties of a physical connection represented by an SID S1-S8. The properties may include such values as throughput, latency, jitter, packet loss, or any other measurable property of a physical connection or data transmission over a physical connection.

The method 1000 may include performing 1012 route selection. For example, for an ingress virtual router 900*a* and an egress virtual router 900*f* and a corresponding set of route decision criteria, step 1012 may include selecting a set of SIDs S1-S8 that form a complete path between the ingress virtual router 900*a* and the egress virtual router 900*f* and such that the aggregate of the properties and cost of the selected SIDs (e.g., reported properties for the physical connection represented by each SID) at least one of (a) satisfies the route decision criteria, (b) is the closest to the route decision criteria as compared to all possible alternative routes, or (c) is the route that comes closest to the route decision criteria upon reaching a stopping condition of an optimization algorithm (e.g., iteration limit, improvement for an iteration below a threshold, etc.).

The aggregation of properties for a route may include the total latency (e.g., sum) of the SIDs of the route, minimum throughput of the SIDs of the route, maximum jitter of the SIDs of the route, maximum packet loss of SIDs of the route, or other combination of the properties of the network connections represented by the SIDs. The cost of a route may include ingress charges, egress charges, transfer charges, or other charges required for data to traverse the route. For example, the cost of a route may be sum of the costs associated with each SID of the route.

Once a route is selected 1012, the method 1000 may include configuring 1014 one or both of the ingress virtual router 900*a* and the egress virtual router 900*f* to implement the selected route. In some embodiments, where the ingress virtual router 900*a* implements a segment routing protocol such as SRv6, only configuration of the ingress virtual router 900*a* is required to implement the selected route. For example, an SR policy may be defined that includes a set of SIDs of the selected route. In some embodiments, the SRv6 algorithm (FlexAlgo) may be used to define network slices defining sequences of SIDs defining the selected route. In some embodiments, SRv6 Traffic Engineering (SR-TE) may be used to provide topology-independent loop free alternative (TILFA) routing for load balancing across multiple available links that meet the route decision criteria.

A VRF may be defined on the ingress virtual router 900*a* that maps a destination address, or combination of a destination and source address to the SR policy. Accordingly, packets including the destination address, or the combination of the destination address, and referencing the identifier of the VRF, will be labeled with the set of SIDs and routed accordingly. Such packets will then be routed along the selected path according to the set of SIDs, such as according to SRv6. One of the SIDs may include a service SID defining routing from the egress virtual router 900*f* to the destination address. Step 1014 may further include setting up a protocol tunnel between the ingress virtual router 900*a* and the egress virtual router 900*f*.

Note that the costs and other properties of a network path represented by an SID may change over time, such as by time of day or day of the week and the selected route used may also vary by time of day or day of the week. In some embodiments, a plurality of routes may be selected, each corresponding to a different time of day or day of the week. Each route may be associated with a different SR Policy and/or VRF, thereby enabling the rapid switching of routing of traffic by changing the SR policy and/or VRF applicable to data transmitted from a computing device 814*a* to a computing device 814*b*.

Steps 1010-1014 may be performed repeatedly. In particular, network connections may go down or otherwise become ineligible (see FIG. 11 and corresponding discussion). The properties of network connections may also change. For example, components of a cloud 800*a*, 800*b* or colocation provider 806*a*, 806*b* may be added or go down. Costs may change over time. Accordingly, route selection 1012 may be repeated based on such changes to determine whether a route is available that better satisfies the route decision criteria.

The method 1000 may be accompanied with generating one or more reports. For example, for a route selected at step 1012, a report may be generated that lists, or otherwise provides a representation of, differences in cost, latency, throughput, or other metric for a selected route as compared to a reference route, such as a route selected according to OSPF or other routing protocol that does not consider financial cost.

Figure 11:
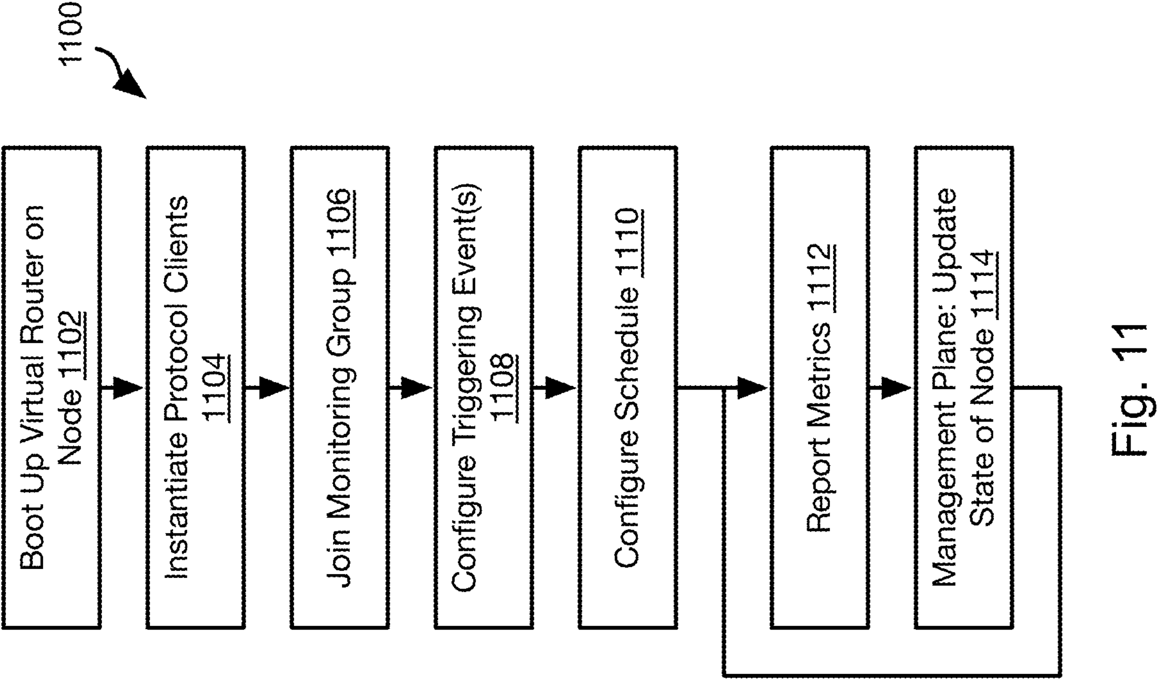
FIG. 11 is a process flow diagram of a method for configuring an individual node to facilitate routing in a cost-aware manner in accordance with an embodiment of the present invention.

FIG. 11 illustrates a method 1000 for setting up a node in a cloud 800*a*, 800*b*, colocation provider 806*a*, 806*b*, on-premise server, or other computing device. A node may therefore be a unit of computing resources (memory, storage, computation) within a cloud 800*a*, 800*b* or colocation provider 806*a*, 806*b*. A node may also be an on-premise server, or other computing device. The method 1100 may be invoked by and/or controlled by the management plane 812.

The method 1000 may include booting up 1102 a virtual router on the node. Booting up may include starting execution of an operating system, virtual machine, and/or container for executing a virtual router 810*a*-810*h*. Booting up may further include instantiating a virtual router 810*a*-810*f* within the operating system, virtual machine, and/or container.

The method 1100 may include instantiating 1104 protocol clients for implementing network connections, performing routing, and/or exchanging routing information. For example, protocol clients may include an SRv6 client, a border gateway protocol (BGP) client, open shortest path first (OSPF) client, or other protocol client. The protocol clients may include clients implementing one or more tunneling protocols, such as VPN, GRE, IPSec, or the like.

The method 1100 may include joining 1106, by the virtual router, a monitoring group 1106, such as a monitoring group specified by the management plane 812. The monitoring group may include some or all virtual routers 810*a*-810*h* forming the virtual routers 900*a*-900*f* of a particular VRF 900. The monitoring group may include an identifier such as reports of network performance may be labeled with the monitoring group identifier to facilitate relating the reports to a particular VRF 900.

The method 1100 may include configuring 1108 triggering events for the node and/or configuring 1108 a schedule for the node. Triggering events may include events that will invoke transmission of probe traffic to test network performance by the virtual router of the node. Triggering vents may include dropping of a packet, a threshold number of packets dropped within a time period, a network property meeting a threshold condition (latency above a threshold, dropped packets above a threshold, throughput below a threshold, jitter above a threshold, etc.). Triggering events may include route changes (e.g., adding of a virtual router), changes to application counters (e.g., adding an application instance). A schedule may include a predefined period at which probe traffic will be transmitted by the virtual router. The schedule may define different periods for different times of day and/or days of the week.

Following step 1110, the virtual router will transmit probe traffic to test network performance of one or more network connections connected to the virtual router. Probe traffic may be according to one or more protocols and may include probe traffic sent over logical tunnels (e.g., GRE, SRv6, IPSec, etc.). The virtual router will report 1112 the results of the probe traffic for each network connection to the management plane 812, such as using a networking protocol such as BGP, OSPF, or the like. The management plane may then update 1114 a state associated with the node based on the reports. For example, the management plane may update a database storing properties of a network connection (e.g., latency, throughput, jitter) for purposes of performing 1012 route selection. The management plane may designate a network connection to the node (e.g., the virtual router) as being eligible or ineligible for forming part of a path selected at step 1012. For example, a network connection to a node may be designated as ineligible if a property (e.g., latency, throughput, jitter) falls below a corresponding eligibility threshold. A network connection to a node may be designated as ineligible if a property (e.g., latency, throughput, jitter) falls below a corresponding eligibility threshold. For example, average latency in a first window as a percentage of average latency over a second window that is longer than the first window may be evaluated. A network connection to a node may be designated as ineligible if a fraction of dropped packets per unit time (e.g., per hour, per minute, per second) exceeds a dropped-packet threshold. In some embodiments, a node is designated ineligible if a number of reports with one or more values (e.g., latency, throughput, jitter, dropped packets) that do not meet corresponding thresholds is greater than a report threshold.

Figure 12:
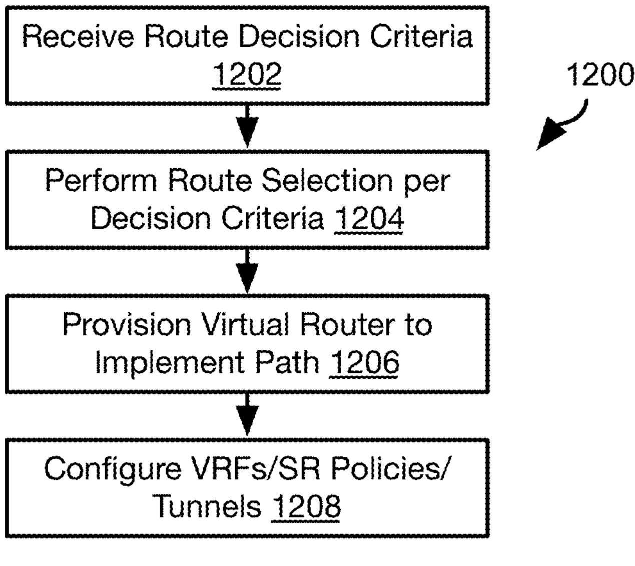
FIG. 12 is a process flow diagram of a method for provisioning a virtual router for facilitating routing in a cost-aware manner in accordance with an embodiment of the present invention.

FIG. 12 illustrates a method 1200 that may be executed by the management plane 812. The method 1200 may be used to automatically provision a virtual router in a regional cloud 802*a*-802*f* or colocation provider 806*a*, 806*b* that currently lacks a virtual router.

The method 1200 may include receiving 1202 route decision criteria (see step 1008, described above) and selecting 1204 a route according to the decision criteria. Step 1204 may include evaluating network paths to regional clouds 802*a*-802*f* and/or colocation providers 806*a*, 806*b* that lack a virtual router 810*a*-810*h*. Properties of such paths may be determined using values reported by the provider of the regional clouds 802*a*-802*f* and/or colocation providers 806*a*, 806*b*. Properties of such paths may be obtained by transmitting probe traffic through the regional clouds 802*a*-802*f* and/or colocation providers 806*a*, 806*b*. Properties of such paths may be obtained by sending probe traffic to utilities executing in such regional clouds 802*a*-802*f* and/or colocation providers 806*a*, 806*b*. The cost of such paths may be obtained from the providers of the regional clouds 802*a*-802*f* and/or colocation providers 806*a*, 806*b*. Identifying 1204 a route between an ingress virtual router 900*a* and an egress virtual router 900*f* may be performed as described above with respect to step 1012 with the exception that paths through a regional cloud 802*a*-802*f* and/or colocation provider 806*a*, 806*b* are considered even where a virtual router is present. For example, in addition to actually network paths and corresponding SIDs, candidate network paths to a regional cloud 802*a*-802*f* and/or colocation provider 806*a*, 806*b* that may or may not have corresponding SIDs may be considered at step 1204 when identifying the selected route.

Step 1204 may likewise include selecting for which an ingress virtual router 900*a* and egress virtual router 900*f* are not currently present.

The method 1200 may include provisioning 1206 a virtual router in each regional cloud 802*a*-802*f* and/or colocation provider 806*a*, 806*b* included in the route selected at step 1204 and that does not currently include a virtual router. Provisioning a 1206 a virtual router may include executing the method 1100 as described above.

The method 1200 may then include configuring 1208 one or more VRFs, SR policies, and/or tunnels to implement the selected route using the virtual router provisioned at step 1206, such as using the approach describe above with respect to step 1014.

Figure 13:
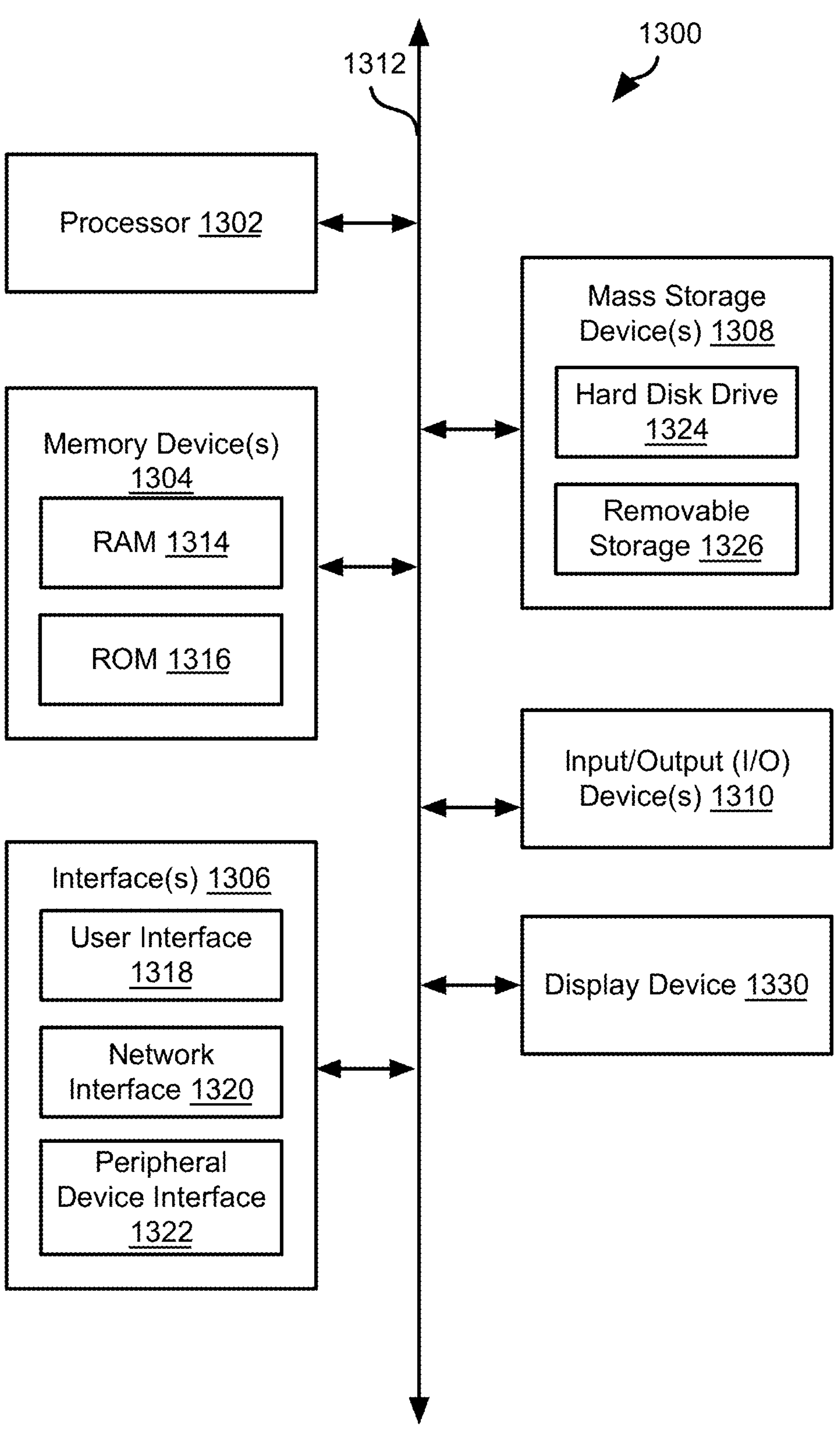
FIG. 13 is a schematic diagram illustrating components of an example computing device.

Referring now to FIG. 13, a block diagram of an example computing device 1300 is illustrated. Computing device 1300 may be used to perform various procedures, such as those discussed herein. Computing device 1300 can be any of a wide variety of computing devices, such as a desktop computer, in-dash computer, vehicle control system, a notebook computer, a server computer, a handheld computer, tablet computer and the like.

Computing device 1300 includes one or more processor(s) 1302, one or more memory device(s) 1304, one or more interface(s) 1306, one or more mass storage device (s) 1308, one or more Input/output (I/O) device(s) 1302, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include several types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

Input/output (I/O) device(s) 1302 include various devices that allow data and/or other information to be input to or retrieved from computing device 1300. Example I/O device(s) 1302 include cursor control devices, keyboards, keypads, microphones, monitors or other display devices, speakers, printers, network interface cards, modems, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 may include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, or any suitable user interface now known to those of ordinary skill in the field, or later discovered), keyboards, and the like.

Bus 1312 allows processor(s) 1302, memory device(s) 1304, interface(s) 1306, mass storage device(s) 1308, and I/O device(s) 1302 to communicate with one another, as well as other devices or components coupled to bus 1312. Bus 1312 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1300 and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:

receiving, by a control plane executing on a computing device, values for a plurality of properties of network paths including one or more computing infrastructure elements, the one or more computing infrastructure elements including at least one of one or more cloud computing networks and one or more colocation providers;

receiving, by the control plane, fee information of the one or more computing infrastructure elements, the fee information including charges for at least one of ingress, egress, and transfer of data with respect to the one or more computing infrastructure elements;

receiving, by the control plane, route selection criteria with respect to a first computing device and a second computing device remote from the first computing device;

selecting, by the control plane, a selected route for connecting the first computing device to the second computing device according to the route selection criteria, the values for the plurality of properties, and the fee information; and configuring, by the control plane, the one or more computing infrastructure elements to implement the selected route;

wherein configuring the one or more computing infrastructure elements to implement the selected route comprising provisioning, by the control plane, one or more virtual routers in the one or more computing infrastructure elements;

wherein configuring the one or more computing infrastructure elements to implement the selected route comprising configuring, by the control plane, a virtual routing function (VRF) for the one or more virtual routers, the VRF corresponding to the selected route;

wherein the selected route is a first selected route, the route selection criteria is a first route selection criteria, and the VRF is a first VRF, the method further comprising:

receiving, by the control plane, second route selection criteria different from the first route selection criteria;

selecting, by the control plane, a second selected route for connecting the first computing device to the second computing device according to the second route selection criteria, the values for the plurality of properties, and the fee information; and configuring, by the control plane, a second virtual routing function (VRF for the one or more virtual routers, the VRF corresponding to the second selected route.

2. The method of claim 1, wherein configuring the one or more computing infrastructure elements to implement the selected route comprising configuring, by the control plane, the one or more virtual routers to implement segment routing.

3. The method of claim 1, wherein the first selected route has a first total cost according to the fee information and the second selected route has a second total cost according to the fee information that is different from the first total cost.

4. The method of claim 3, wherein the first selected route has a first latency according to the values for the plurality of properties of the network paths and the second selected route has a second latency according to the plurality of properties of the network paths, the second latency being different from the first latency.

5. The method of claim 1, wherein selecting the selected route comprises selecting segments according to a segment routing protocol, the segments corresponding to the network paths including the one or more computing infrastructure elements.

6. The method of claim 5, wherein the values for the plurality of properties of the network paths and the fee information is associated with the segments.

7. The method of claim 1, further comprising configuring the one or more virtual routers to transmit monitoring traffic.

8. The method of claim 1, wherein the plurality of properties include at least one of latency or throughput.

9. The method of claim 1, wherein the plurality of properties include at least one of jitter or packet loss.

10. The method of claim 1, wherein the route selection criteria includes a total cost for transferring data between the first computing device and the second computing device.

11. The method of claim 1, where the route selection criteria includes at least one of a latency requirement and a throughput requirement.

12. A non-transitory computer-readable medium storing executable code, that, when executed by one or more processor devices, causes the one or more processor devices to:

receive values for a plurality of properties of network paths including one or more computing infrastructure elements, the one or more computing infrastructure elements including at least one of one or more cloud computing networks and one or more colocation providers;

receive fee information of the one or more computing infrastructure elements, the fee information including charges for at least one of ingress, egress, and transfer of data with respect to the one or more computing infrastructure elements;

receive route selection criteria with respect to a first computing device and a second computing device remote from the first computing device;

select a selected route for connecting the first computing device to the second computing device according to the route selection criteria, the values for the plurality of properties, and the fee information; and configure the one or more computing infrastructure elements to implement the selected route;

configure the one or more computing infrastructure elements to implement the selected route by provisioning one or more virtual routers in the one or more computing infrastructure elements;

configure the one or more computing infrastructure elements to implement the selected route comprising configuring a virtual routing function (VRF) for the one or more virtual routers, the VRF corresponding to the selected route;

wherein the selected route is a first selected route, the route selection criteria is first route selection criteria, and the VRF is a first VRF:

wherein the executable code, when executed by the one or more processor devices, further causes the one or more processor devices to:

receive second route selection criteria different from the first route selection criteria;

select a second selected route for connecting the first computing device to the second computing device according to the second route selection criteria, the values for the plurality of properties, and the fee information; and configure a second virtual routing function (VRF) for the one or more virtual routers, the VRF corresponding to the second selected route.

13. The non-transitory computer-readable medium of claim 12, wherein the executable code, when executed by the one or more processor devices, further causes the one or more processor devices to configure the one or more computing infrastructure elements to implement the selected route by configuring the one or more virtual routers to implement segment routing.

14. The non-transitory computer-readable medium of claim 12, wherein the first selected route has a first total cost according to the fee information and the second selected route has a second total cost according to the fee information that is different from the first total cost; and wherein the first selected route has a first latency according to the values for the plurality of properties of the network paths and the second selected route has a second latency according to the plurality of properties of the network paths, the second latency being different from the first latency.

* * * * *